(12) United States Patent
Cernasov

(10) Patent No.: US 8,125,520 B2
(45) Date of Patent: Feb. 28, 2012

(54) SYSTEM FOR ESTABLISHING REFERENCES FOR MULTI-IMAGE STITCHING

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 1499 days.

(21) Appl. No.: 11/602,335

(22) Filed: Nov. 21, 2006

(65) Prior Publication Data

US 2008/0117286 A1    May 22, 2008

(51) Int. Cl.
*H04N 7/18* (2006.01)
*G06K 9/00* (2006.01)
*G06K 9/36* (2006.01)

(52) U.S. Cl. .................. 348/135; 348/E5.022; 382/151; 382/284

(58) Field of Classification Search .................. None
See application file for complete search history.

(56) References Cited

U.S. PATENT DOCUMENTS

| | | | |
|---|---|---|---|
| 4,899,921 A * | 2/1990 | Bendat et al. .................. 228/105 |
| 6,219,011 B1 * | 4/2001 | Aloni et al. ..................... 345/1.3 |
| 6,471,355 B1 * | 10/2002 | Monson et al. .................. 353/30 |
| 6,522,787 B1 * | 2/2003 | Kumar et al. ................... 382/268 |
| 6,529,625 B2 * | 3/2003 | Sentoku et al. ............... 382/151 |
| 7,684,647 B2 * | 3/2010 | Fu et al. ......................... 382/294 |
| 2003/0142882 A1 | 7/2003 | Beged-Dov et al. | |

* cited by examiner

*Primary Examiner* — Wen-Tai Lin
(74) *Attorney, Agent, or Firm* — Ingrassia Fisher & Lorenz, P.C.

(57) ABSTRACT

An imaging system for generating multiple images includes a first imaging device and a second imaging device. The first imaging device includes a sensor and has a first optical path from an object to the sensor for generating a first object image. The second imaging device includes a sensor and has a first optical path from an object to the sensor for generating a second object image. At least one of the first imaging device and the second imaging device includes a second optical path from an external reference marker to its sensor for generating a reference image. The reference image indicates positioning of the first imaging device or the second imaging device.

19 Claims, 7 Drawing Sheets

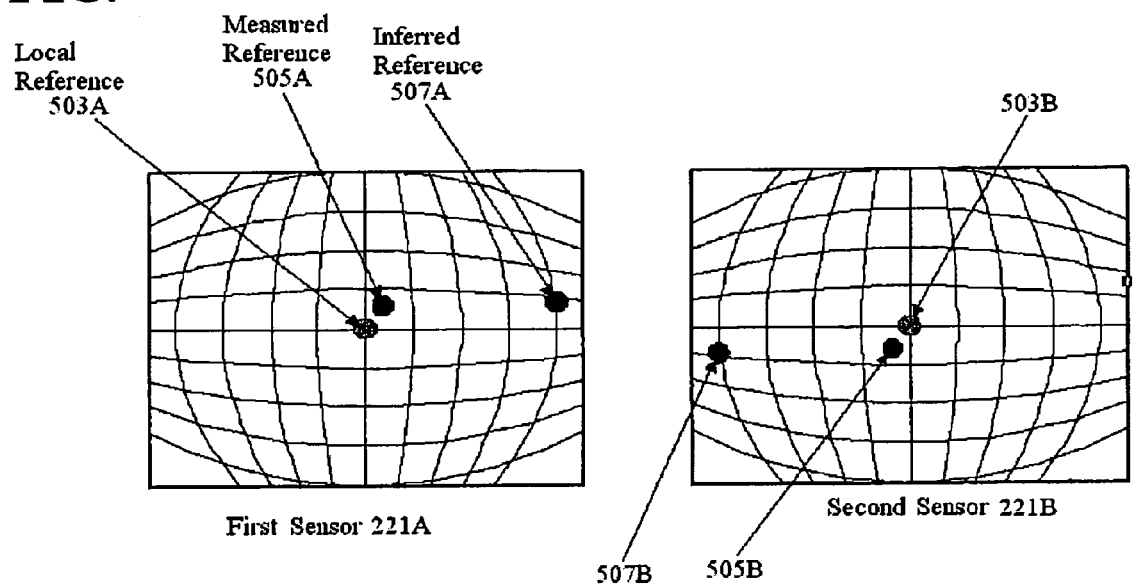

Aligned

Pitch

Yaw

Roll

SYSTEM FOR ESTABLISHING REFERENCES FOR MULTI-IMAGE STITCHING

BACKGROUND OF THE INVENTION

1. Field of the Invention

The present invention relates to imaging systems, and more particularly to a system for aligning images obtained from multiple imaging devices.

2. Description of the Related Art

For many military, civilian, or industrial applications, such as industrial machine vision, military imaging, survey operations, etc., multiple images may be combined into one large and continuous image (e.g., a panoramic image). The process of combining "off-line" multiple images into one large and continuous image is typically computationally intensive. The "off-line" image combination process starts with correcting geometrical distortions associated with the individual images. The process continues with the identification and/or generation of image references within each individual image. The image references may be fixed references, such as, for example, edges of images. The image references may also be selected as easily identifiable reference objects, such as pre-positioned or projected markers. After image references for individual images have been identified or generated, the references of different images are aligned, and maps for an overall partition of the panoramic image are compiled. The partition separates non-overlapping images from overlapping images, and assigns different algorithms to non-overlapping and overlapping images. With one algorithm, overlapping images are warped and matched along seams. The output pixels for the group of overlapping images are generated by interpolating source pixels in the images. With another algorithm, non-overlapping images are warped and attribute-matched to their neighboring images.

The above technique for combining "off-line" multiple images into one image could also be applied to live video images, however, the resulting computational complexity may make such image processing systems bulky and prohibitively expensive. Moreover, the use of multiple buffers for image processing, as may be used for "off-line" image combinations, may bring image latency to levels unacceptable for many applications that use live imaging. The alignment of live video images from multiple cameras, prior to panoramic image stitching, may demand more resources than are available to most systems.

One system for alignment of images for stitching is described in US Patent Application 2003/0142882 A1 by Gabriel Beged-Dov et al. The system described in this patent application generates fiducial marks on adjacent subject scenes, at user-determined locations. The subject scenes are then combined into a stitched image, by matching their fiducial marks. This system, however, requires steps of repositioning image-capturing devices, projecting images after they are captured, and removing fiducial artifacts from the final stitched image.

Disclosed embodiments of this application address these and other issues by providing each imaging device with a secondary optical path for generating a reference image, which is used to determine positioning.

SUMMARY OF THE INVENTION

According to one aspect, the present invention is an imaging system for generating multiple images that includes a first imaging device and a second imaging device. The first imaging device includes a sensor and has a first optical path from an object to the sensor for generating a first object image. The second imaging device includes a sensor and has a first optical path from an object to the sensor for generating a second object image. At least one of the first imaging device and the second imaging device includes a second optical path from an external reference marker to its sensor for generating a reference image. The reference image indicates positioning of the first imaging device or the second imaging device.

According to another aspect, the present invention is an imaging system for generating multiple images that includes a first imaging device and a second imaging device. The first imaging device includes a sensor and has a first optical path from an object to the sensor for generating a first object image. The second imaging device includes a sensor and has a first optical path from an object to the sensor for generating a second object image. The sensor of the first imaging device and the sensor of the second imaging device are two-dimensional sensor arrays. At least one of the first imaging device and the second imaging device includes a second optical path from an external reference marker to its sensor for generating a reference image in overlay fashion with the object image generated on its sensor. Pixel and line coordinates for the sensor of the first imaging device or the sensor of the second imaging device sensor are adjusted as a function of the reference image position on the sensor to automatically align first object image or the second object image.

BRIEF DESCRIPTION OF THE DRAWINGS

Further aspects and advantages of the present invention will become apparent upon reading the following detailed description in conjunction with the accompanying drawings. These drawings do not limit the scope of the present invention. In these drawings, similar elements are referred to using similar reference numbers, wherein:

FIG. 3C illustrates a technique for inferring imaging positioning of another imaging device as a function of an imaged reference marker according to an embodiment of the present invention;

DETAILED DESCRIPTION

Figure 1:
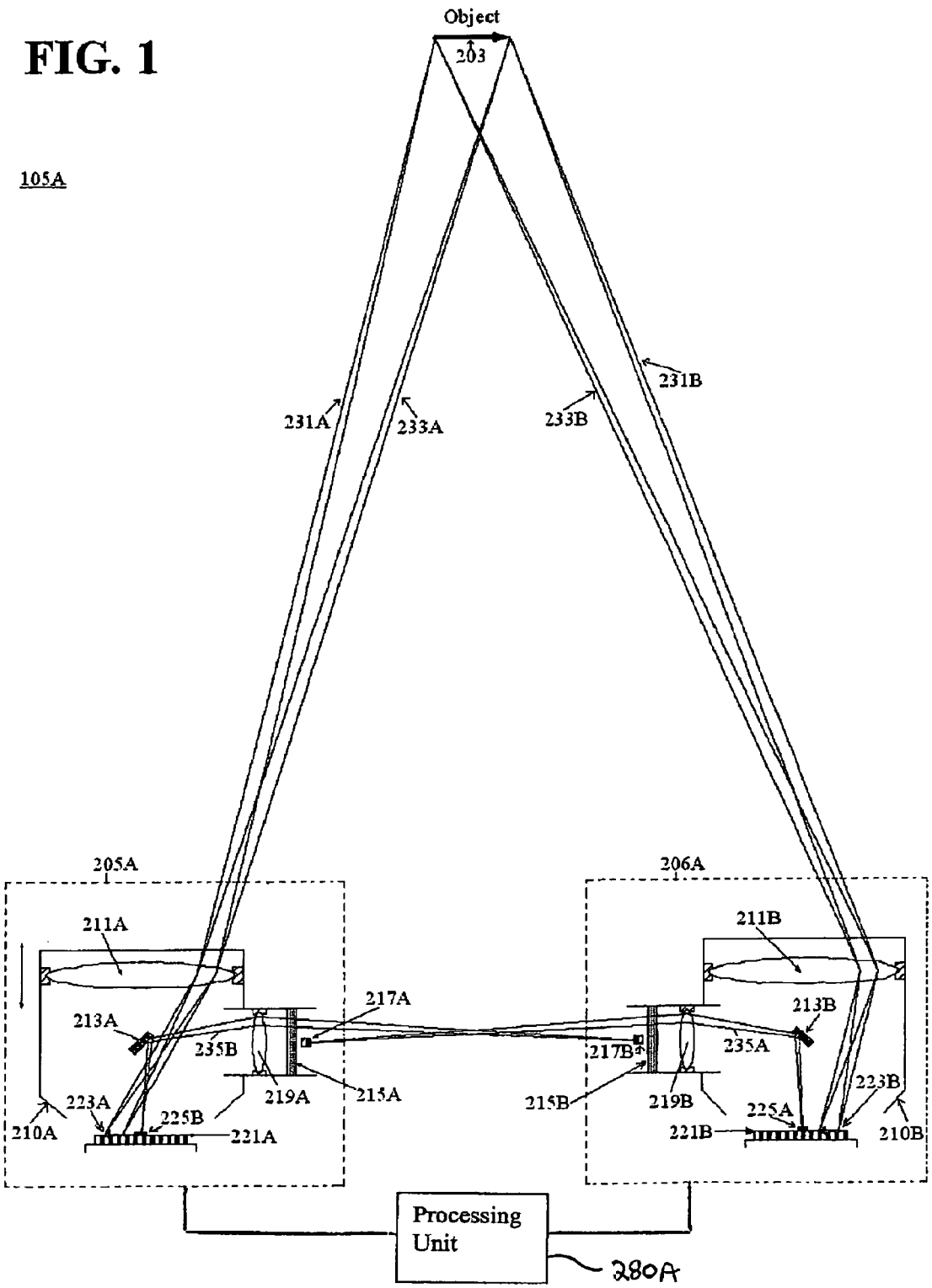
FIG. 1 illustrates a configuration for establishing references for multi-image stitching according to an embodiment of the present invention.

Aspects of the invention are more specifically set forth in the accompanying description with reference to the appended figures. FIG. 1 illustrates a system 105A for establishing references for multi-image stitching according to an embodiment of the present invention. The system 105A includes a first imaging device 205A; a second imaging device 206A; and a processing unit 280A. Although two imaging devices are included in the illustration of FIG. 1, it should be recognized that the system 105A may include additional imaging devices. In one implementation, imaging devices 205A and 206A are video cameras mounted on a vehicle to provide multiple fields of view for display to the vehicle operator.

As shown in FIG. 1, the first imaging device 205A according to this embodiment includes: a protective case 210A; primary optics 211A; a path directing unit 213A; a filter 215A; reference optics lenses 219A; a sensor 221A; and a reference pattern 217A. The second imaging device 206A according to this embodiment includes: a protective case 210B; primary optics 211B; a path directing unit 213B; a filter 215B; reference optics lenses 219B; a sensor 221B; and a reference pattern 217B. Hence, a reference pattern is included in each imaging device in system 105A. The sensor 221A and the sensor 221B may be any suitable sensor for converting light into electrical charges, such as charge coupled devices (CCDs), complementary metal oxide semiconductor (CMOS) sensors, etc.

Each imaging device is designed with at least two optical paths. For example, the first imaging device 205A has a primary optical path from the scene/object to be imaged (object 203), through primary optics 211A, to the local sensor 221A. Ray bundles 231A and 233A originate at object 203, pass through and are transmitted by primary optics 211A, and reach sensor 221A inside imaging device 205A. The first imaging device 205A also has at least one secondary optical path tracing from reference pattern 217B of the second imaging device 206A, through secondary optics, to the local sensor 221A. The primary optics 211A includes optical elements such as lenses, filters, etc., that change properties and directions of incoming rays. The secondary optics includes the filter 215A, the reference optics lenses 219A, and the path directing unit 213A. The path directing unit 213A changes the direction of light, so that light from reference pattern 217B is directed to the local image sensor 221A. The path directing unit 213A may be a mirror, a prism, a reflecting optics system, etc. Ray bundles 235B originate at reference pattern 217B included in imaging system 206A, pass through filter 215A and reference optics lenses 219A, are reflected by path directing unit 213A, and reach sensor 221A inside the first imaging device 205A. The local sensor 221A is thus exposed, in a transparent overlay fashion, to both the image of the scene/object to be imaged (object 203) and the image of the reference pattern 217B. Object 203 creates object image 223A on sensor 221A, while reference pattern 217B creates reference image 225B on sensor 221A.

Similar imaging occurs inside the second imaging device 206A. The second imaging device 206A has a primary optical path tracing from the scene/object to be imaged (object 203), through primary optics 211B, to the local image sensor 221B. Ray bundles 231B and 233B originate at object 203, pass through and are transmitted by primary optics 211B, and reach sensor 221B inside the second imaging device 206A. Imaging system 206A also has at least one secondary optical path tracing from reference pattern 217A of the first imaging device 205A, through secondary optics, to the local sensor 221B. The primary optics 211B includes optical elements such as lenses, filters, etc., that change properties and directions of incoming rays. The secondary optics includes the filter 215B, the reference optics lenses 219B, and the path directing unit 213B. The path directing unit 213B changes the direction of light, so that light from reference pattern 217A is directed to the local sensor 221B. The path directing unit 213B may be a mirror, a prism, a reflecting optics system, etc. Rays 235A originate at reference pattern 217A included in the first imaging device 205A, pass through and are transmitted by filter 215B and reference optics lenses 219B, are reflected by path directing unit 213B, and reach sensor 221B inside the second imaging device 206A. The local sensor 221B is thus exposed, in a transparent overlay fashion, to both the image of the scene/object to be imaged (object 203) and the image of the reference pattern 217A. Object 203 creates object image 223B on sensor 221B, while reference pattern 217A creates reference image 225A on sensor 221B.

Hence, each imaging device (205A and 206A) images both an outside object (such as object 203), and the reference pattern (217B, 217A) of the other imaging device. Using the reference image 225B of the reference pattern 217B from the second imaging device 206A, the first imaging device 205A can acquire the accurate position of a neighboring sensor (imaging device), such as the second imaging device 206A, in a fast and reliable manner. Similarly, using the reference image 225A of the reference pattern 217A from the first imaging device 205A, the second imaging device 206A can acquire the accurate position of the first imaging device 205A, in a fast and reliable manner. While the position of object images 223A and 223B on neighboring sensors 221A and 2211B depends on the position of object 203 relative to the positions of the sensors 221A and 221B, the positions of the reference images 225B and 225A on sensors 221A and 2211B depend on the relative position of the two imaging devices 205A and 206A with respect to each other.

Hence, to perform multi-image stitching, the imaging devices 205A and 206A image reference patterns placed on the other imaging device. In one implementation, the processing unit 280A electronically aligns and stitches the object images 223A, 223B from the imaging devices 205A and 206A based on the positioning of reference images using a user-preferred algorithm for output to a display (not shown). In another embodiment, a technique for automatic image alignment similar to that described in co-pending application titled "Multi-Band Camera System" and filed Nov. 2, 2006, which is hereby incorporated by reference in its entirety, may be applied to accurately align images for stitching, while minimizing image post-processing. More specifically, this automatic technique sets the pixel and line counts of a predetermined reference point on sensors 221A, 221B to the corresponding pixel and line counts of the detected reference images on sensors 221A, and 221B. In this way, automatic image alignment may be achieved without significant processing overhead, and with minimized latency. With this alignment technique, alignment can be performed for every frame of a video sequence, hence accommodating even the most demanding applications.

Two imaging devices are illustrated in FIG. 1, but additional imaging devices may be included in the system 105A for establishing references for multi-image stitching using multiple reference patterns. In that case, each imaging device would include a reference pattern, located in the field of view of at least one other imaging device.

Figure 2:
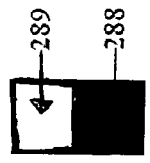
FIG. 2 illustrates an exemplary reference pattern used for establishing references for multi-image stitching according to an embodiment of the present invention illustrated in FIG. 1.

FIG. 2 illustrates an exemplary reference pattern 217A used for establishing references for multi-image stitching according to an embodiment of the present invention illustrated in FIG. 1. The exemplary reference pattern 217A illustrated in FIG. 2 includes two elements 288 and 289. The elements 288, 289 may be different in color/radiation frequency, etc. For example, elements 288 and 289 may be LEDs, with LED 288 emitting light of a first color, and LED 289 emitting light of a second color.

Figure 3A:
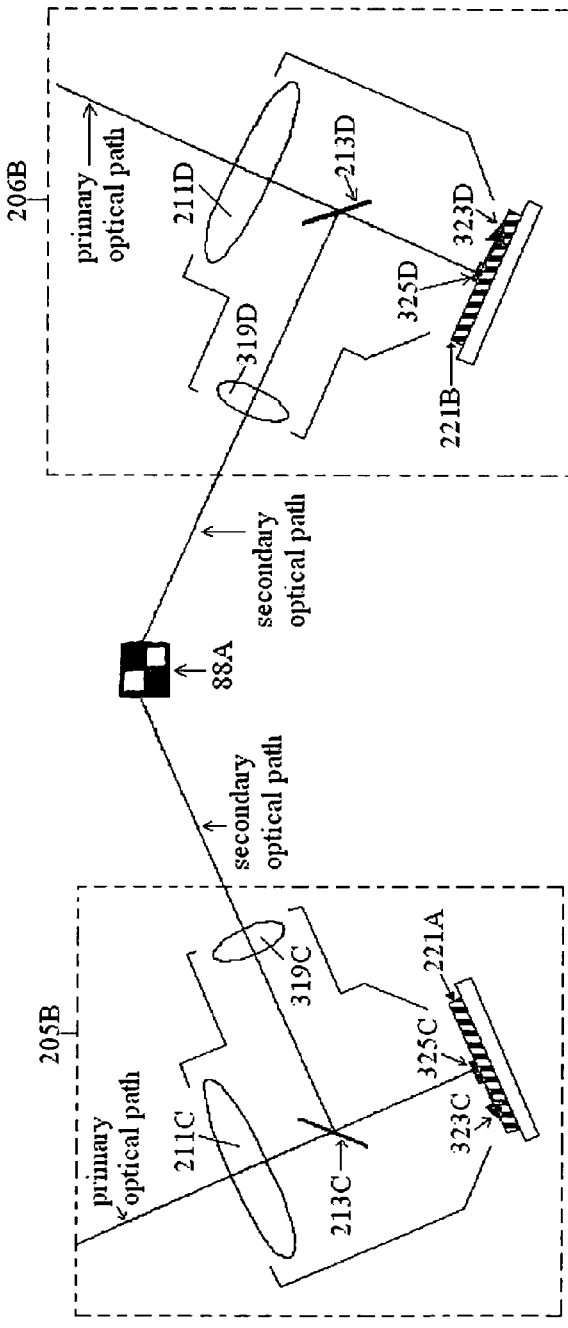
FIG. 3A illustrates a configuration for establishing references for multi-image stitching according to another embodiment of the present invention.

FIG. 3A illustrates a system 105B for establishing references for multi-image stitching using a fixed reference pattern 88A according to another embodiment of the present invention. The system 105B for establishing references for multi-image stitching using a fixed reference pattern includes a first imaging device 205B, a second imaging device 206B, and a reference pattern 88A. It should be apparent that the illustration of the first and second imaging devices 205B, 206B in FIG. 3A is somewhat generalized as compared to the more detailed illustration of imaging devices 205A, 206A in FIG. 1.

As shown in FIG. 3A, the first imaging device according to this embodiment includes: primary optics 211C; a path directing unit 213C; a reference optics system 319C; and a sensor 221A. The second imaging device 206B according to this second embodiment includes: primary optics 211D; a path directing unit 213D; a reference optics system 319D; and a sensor 221B. The reference pattern 88A is located at a fixed position, in the secondary field of view of both imaging devices 205B and 206B. For example, reference pattern 88A may be located between the first imaging device 205B and the second imaging device 206B, e.g., fixed to a location on a vehicle.

Each imaging device is designed to include at least two optical paths. For example, the first imaging device 205B has a primary optical path tracing from a scene/object to be imaged, through primary optics 211C, to the local sensor 221A. The first imaging device 205B also has at least one secondary path tracing, through a side channel, from reference pattern 88A, through secondary optics, to the local sensor 221A. The primary optics 211C includes optical elements such as lenses, filters, etc., that change properties and directions of incoming rays. The secondary optics includes the reference optics system 319C, a filter (not shown) and the path directing unit 213C. The path directing unit 213C changes the direction of light, so that light from reference pattern 88A is directed to the local image sensor 221A. The path directing unit 213C may be a mirror, a prism, a reflecting optics system, etc. The local sensor 221A is thus exposed, in a transparent overlay fashion, to both the image of the scene/object to be imaged and the image of the reference pattern 88A. The scene/object to be imaged creates an object image 323C on sensor 221A, while the reference pattern 88A creates reference image 325C on sensor 221A.

Similar imaging occurs inside the second imaging device 206B. The second imaging device 206B has a first primary path tracing from the scene/object to be imaged, through primary optics 211D, to the local image sensor 221B. The second imaging device 206B also has at least one secondary path tracing, through a side channel, from reference pattern 88A, through secondary optics, to the local image sensor 221B. The primary optics 211D includes optical elements such as lenses, filters, etc., that change properties and directions of incoming rays. The secondary optics includes the reference optics system 319D, a filter (not shown) and the path directing unit 213D. The path directing unit 213D changes the direction of light, so that light from reference pattern 88A is directed to the local image sensor 221B. The path directing unit 213D may be a mirror, a prism, a reflecting optics system, etc. The local sensor 221B is thus exposed, in a transparent overlay fashion, to both the image of the scene to be imaged and the image of the reference pattern 88A. The scene/object to be imaged creates object image 323D on sensor 221B, while reference pattern 88A creates reference image 325D on sensor 221B.

Hence, each imaging device (205B and 206B) images both outside objects and the reference pattern 88A to determine a frame of reference. Using the reference images 325C and 325D of the reference pattern 88A, imaging devices 205B and 206B can acquire accurate position information in a fast and reliable manner, thereby facilitating image stitching. While the position of object images 323C and 323D on sensors 221A and 221B depends on the position of external objects relative to the positions of the sensors 221A and 221B, the position of the reference images 325C and 325D on sensors 221A and 221B depends on the positioning of each imaging device 205B and 206B with respect to the reference pattern 88A. Hence, to perform multi-image stitching, the imaging devices 205B and 206B image the reference pattern 88A to obtain alignment information.

Figure 3B:
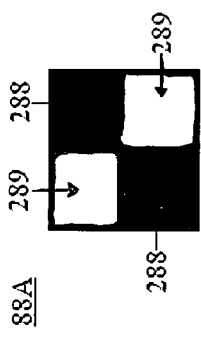
FIG. 3B illustrates an exemplary reference pattern used for establishing references for multi-image stitching according to the embodiment of the present invention illustrated in FIG. 3A.

FIG. 3B illustrates an exemplary reference pattern 88A used for establishing references for multi-image stitching according to the embodiment of the present invention illustrated in FIG. 3A. The exemplary reference pattern 88A illustrated in FIG. 3B may include an arrangement of four elements 288, 289. The elements may be different in color/radiation frequency, etc. For example, patterns 288 and 289 may be LEDs, with LEDs 288 emitting light of a first color, and LEDs 289 emitting light of a second color.

To minimize the impact of the reference image (for example, 325C in FIG. 3A) superimposed on the primary image (for example, 323C in FIG. 3A), the brightness of the reference image may be made significantly higher than its environment, the field of view of the secondary optical path can be limited to a small solid angle, the reference signals may be limited to IR frequencies (with the sensors, such as 221A and 221B, having extended an sensitivity to the IR range), and filters may be used. In the IR range, an IR filter may be used to eliminate IR frequencies from the primary path (external object path) while a visible "black" filter may be used to eliminate visible range frequencies from the secondary path (the reference image path). Other frequency combinations for the primary and secondary paths may also be used.

With reference to FIGS. 3A-C, if the field of view of the secondary optical path for the first imaging device 205B is small and centered on the sensor 221A (the local reference 503A in FIG. 3C), the position of the object image seen by the second imaging device is dependent on the geometrical relationship between the sensor 221B of the second imaging device 206B and the reference pattern 88A, which can be easily calculated. Therefore, as illustrated in FIG. 3C, the position of the reference pattern image (e.g., measured reference 505A on sensor 221A) can be translated into an inferred imaging position (e.g., inferred reference 507A) of the second imaging device 206B. As illustrated in FIG. 3C, this same principle can be applied to infer the imaging position of the first imaging device 205B based on the reference image position on the sensor 221B of the second imaging device 206B.

The reference images (e.g., image 325C in FIG. 3A) can be sized to occupy roughly one pixel in the x and y directions on the imaging sensors (e.g., sensor 221A). If the size of the reference images is bigger than one pixel, the reference location can be calculated at the center of a reference cluster.

Figure 4A:
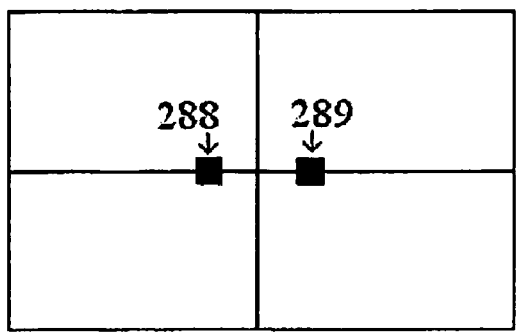
FIGS. 4A-4D illustrate exemplary reference marker image signatures for aligning images according to an embodiment of the present invention.
Figure 4B:
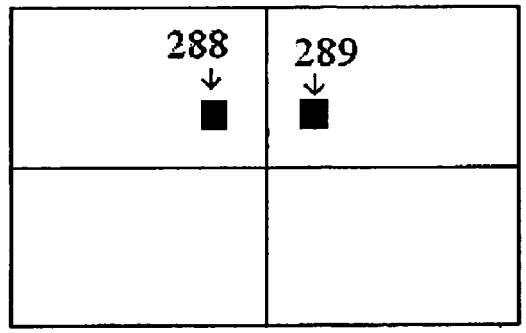
Figure 4C:
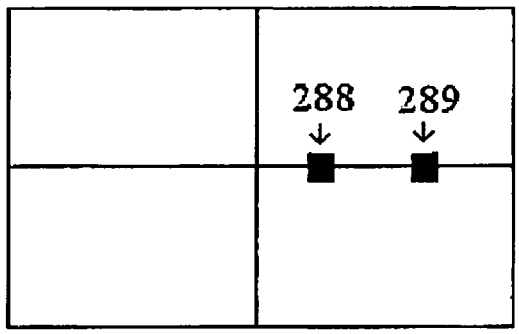
Figure 4D:
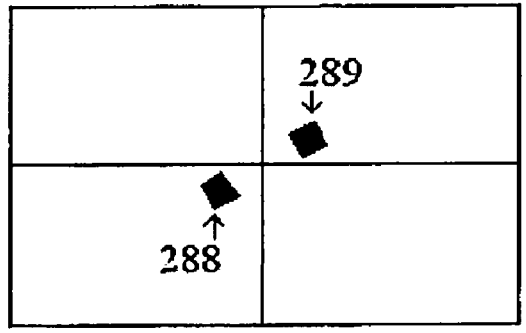

FIGS. 4A-4D illustrate exemplary reference marker images for aligning images from imaging devices according to an embodiment of the present invention. In FIG. 4A, spaced reference markers 288 and 289 are imaged to determine whether, and how, the imaging device is misaligned. In other words, the reference images illustrated in FIGS. 4A-4D are from the perspective of a single imaging device. The positioning of imaged reference markers 288, 289 in FIG. 4A signifies proper alignment of the imaging device; the positioning of imaged reference markers 288, 289 in FIG. 4B signifies pitch attitude rotation of the imaging device; the positioning of imaged reference markers 288, 289 in FIG. 4C signifies yaw attitude rotation of the imaging device; and the positioning of imaged reference markers 288, 289 in FIG. 4D signifies roll attitude rotation of the imaging device. It should be evident to those in the art that additional reference marker signatures may signify multi-attitude rotation (e.g., yaw and pitch attitude rotation, etc.).

In systems described above, a local imaging device can establish its position by locating on its sensor array a pair of reference elements 288 and 289, physically placed on another image device (as shown in FIG. 1) or at a reference location (as shown in FIG. 3A). Two imaging devices may be referenced to each other even if they use different references, if the reference markers on the two imaging systems are fixed with respect to each other.

For multiple overlapping sources, such as m multiple roll, pitch, and yaw detection pairs $(288_1, 289_1)$, $(288_2, 289_2)$, ..., $(288_m, 289_m)$ for more than two imaging devices (e.g., a variation of the embodiment illustrated in FIG. 1 in which the system includes three or more imaging devices), multiple secondary paths for one imaging device for multiple detection pairs 288, 289 may be projected on different areas (quadrants) of the sensor. Thus, a correspondence can be established between different areas (e.g., quadrants) of a sensor $221_1$ of an imaging device $205_1$, and the other neighboring imaging devices $205_2, 205_3, \ldots, 205_p$. Consequently, when a reference is detected in a certain quadrant of an imaging sensor $221_1$ of an imaging device $205_1$, the reference is next assigned to the associated neighboring sensor for one of the neighboring imaging devices $205_2, 205_3, \ldots, 205_p$. Various alternatives to this technique may be applied to such systems with more than two imaging devices.

Figure 5:
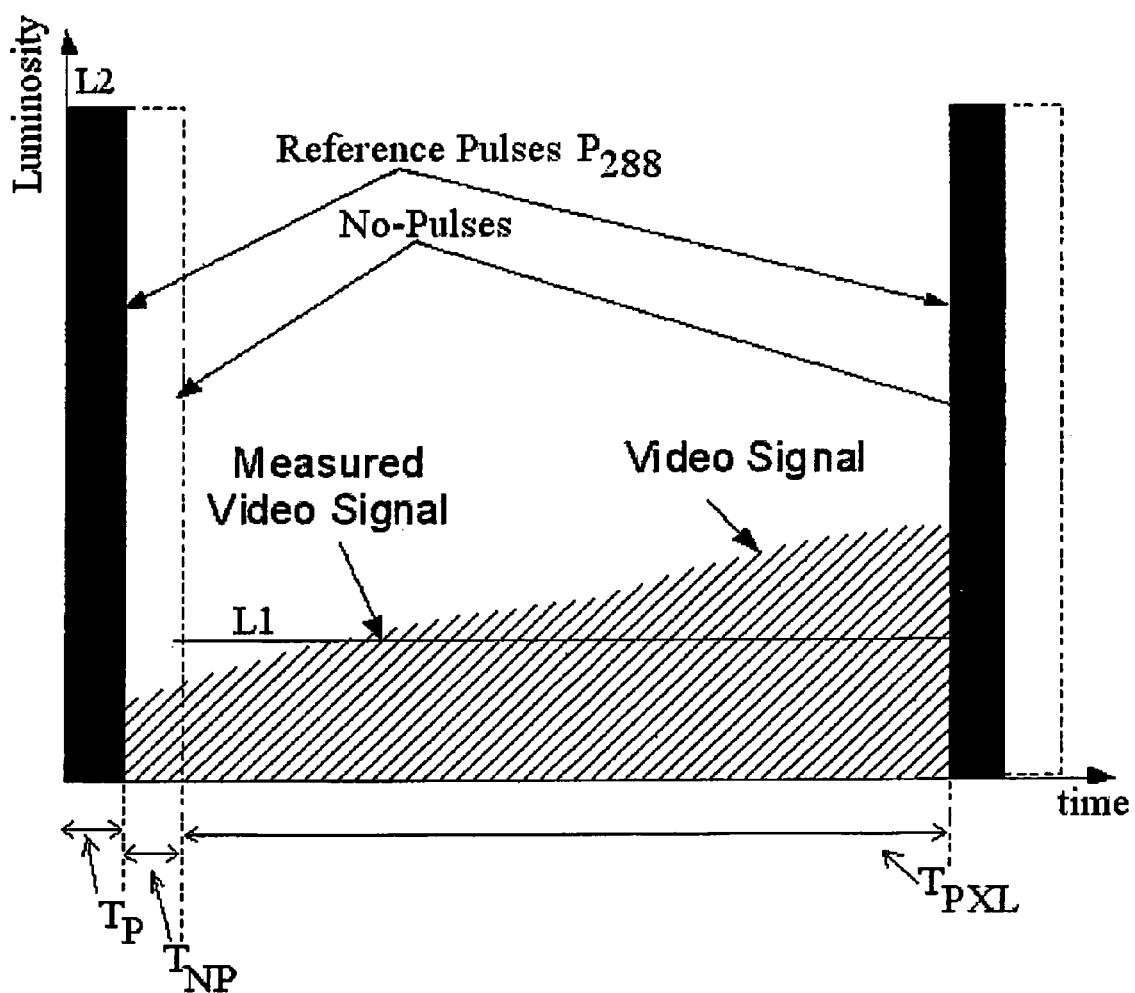
FIG. 5 illustrates a technique for detecting a reference markers according to an embodiment of the present invention.

FIG. 5 illustrates a technique for detecting of a reference marker 288 according to an embodiment of the present invention in a system using multiple video cameras as imaging devices. The reference marker in this implementation is associated with a reference pulse $P_{288}$, which is imaged by the sensor of an imaging device. In FIG. 5, L2 represents a measured luminance level duration for the reference pulse $P_{288}$ and L1 represents the measured image signal duration for an object image pixel. The detection technique illustrated in FIG. 5 is shown for a reference marker that is very bright (high luminosity) but has a short duration, $T_P$, compared to the pixel period $T_{PXL}$ of the imaging device. By integrating the video signals for a period equal to the reference pulse width $T_P$, in a manner synchronous with the reference pulse width $T_P$, the reference marker signal to object signal ratio can be made very high. In addition, subtracting from the detected value of the signal during a pulse the detected value from a neighboring "no-pulse" period $T_{NP}$ further improves the signal ratio. Other techniques for detecting the reference image, such as that disclosed in the co-pending application titled "Multi-Band Camera System," may be applied.

Figure 6:
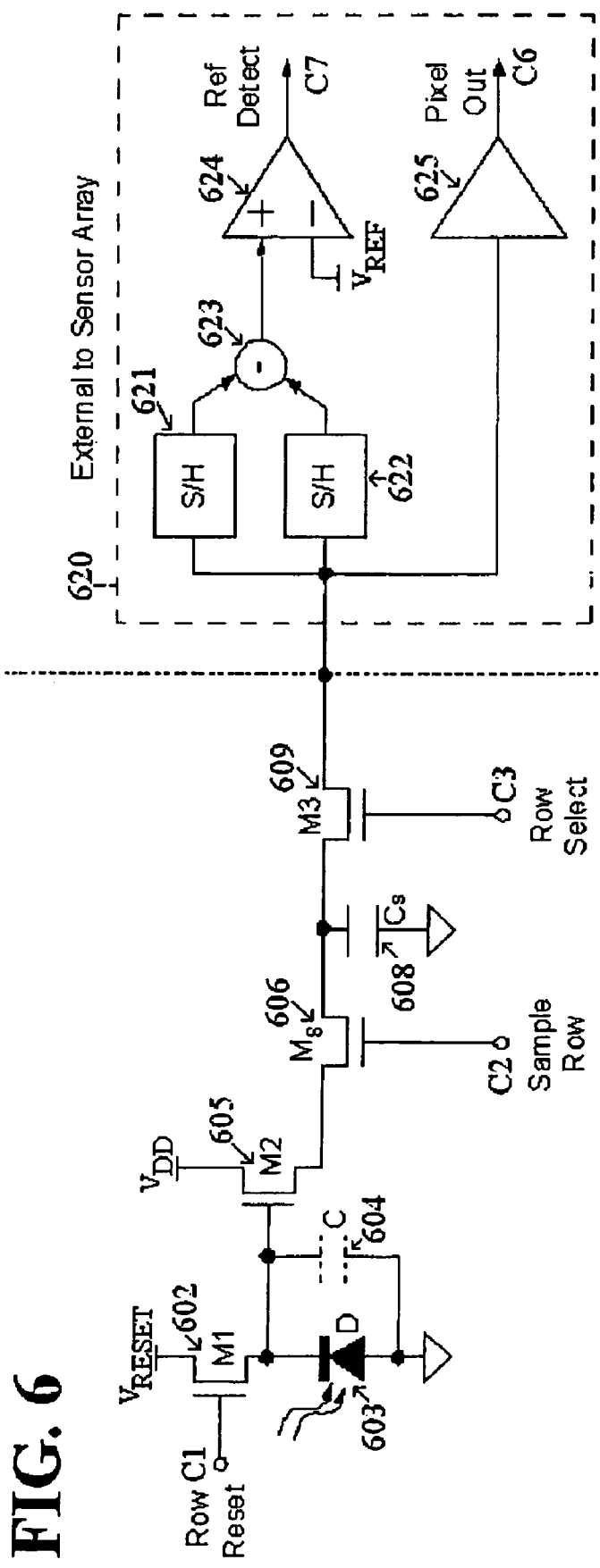
FIG. 6 illustrates a circuit implementing fast detection of reference markers according to an embodiment of the present invention.

FIG. 6 illustrates a circuit implementing fast detection of reference markers, according to an embodiment of the present invention. The sensor circuit in FIG. 6 may be used, for example, for fast detection of video reference markers. In this embodiment, a standard CMOS array is modified with the addition of a local sample-and-hold (S/H) circuit including MOSFET $M_S$ 606 and capacitor $C_S$ 608. The local S/H circuit is used to store the readings of the sensor signal at times $T_P$, $T_{NP}$, and $T_{PXL}$, as illustrated in FIG. 5. The imaging system sensors include radiation sensitive components, such as a photodiode D (603).

Each pixel is then read three times with the values at $T_P$ and $T_{NP}$ being stored in external S/H circuits 620, at sample-and-hold units 621 and 622. Then the value at $T_{NP}$ is subtracted from the value at $T_P$ by subtracting unit 623. The output from the subtracting unit 623 is compared with a voltage reference value, $V_{REF}$, to determine if a reference signal (coming from a reference marker) has been identified (Ref Detect at terminal C7). If a reference signal has been identified, its position is marked by a system controller, and the value at $T_P$ may be subtracted from the value at $T_{PXL}$, to find the real value of the local scene/object pixel.

Figure 7:
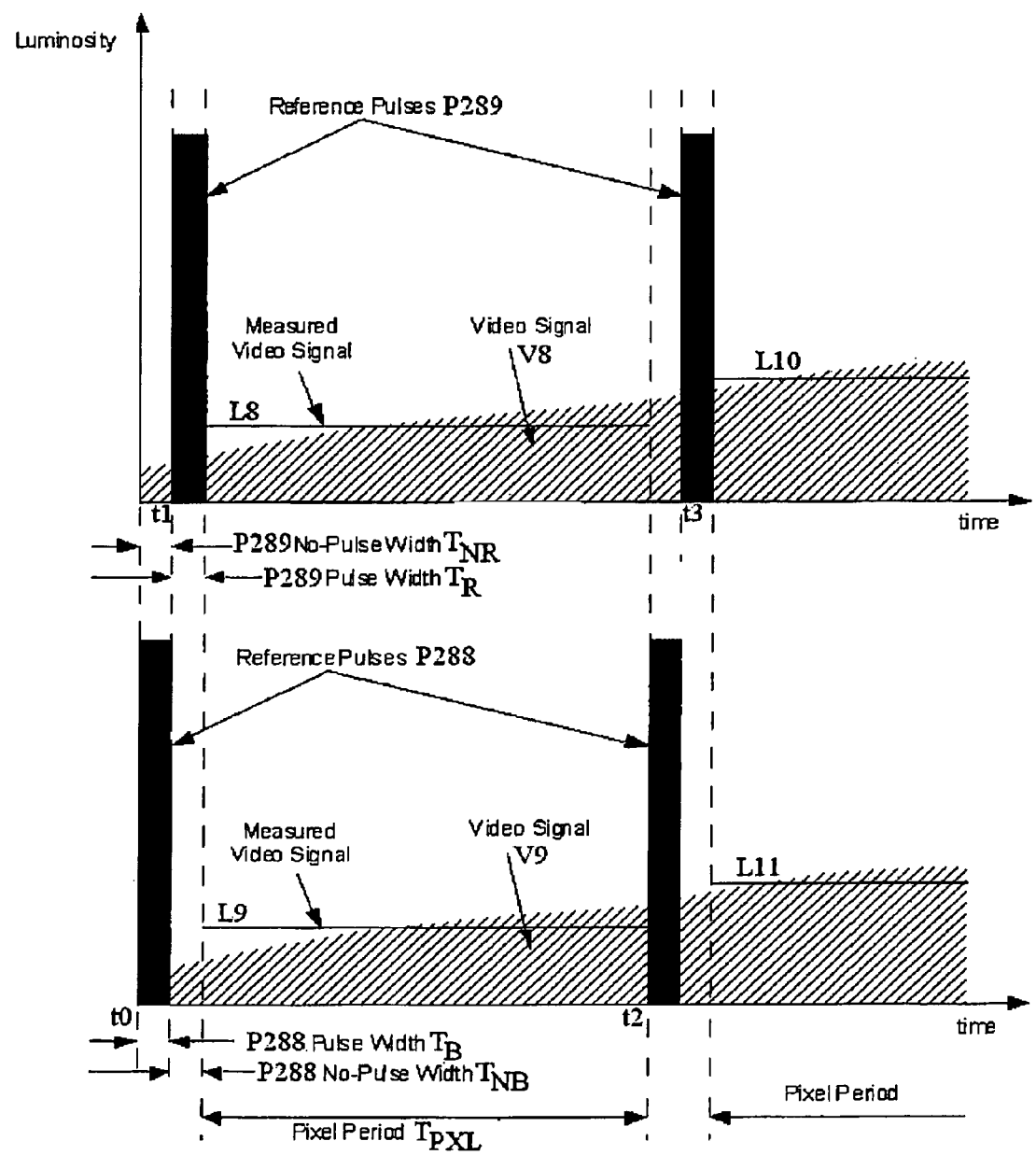
FIG. 7 illustrates a technique for detecting two reference markers, according to an embodiment of the present invention.

FIG. 7 illustrates a technique for detecting two reference markers 288 and 289, according to an embodiment of the present invention. This technique may be applied to recognize two separate reference signals 288 and 289 according to embodiment described above with reference to FIGS. 4A-4D. This detection technique is illustrated for reference markers that are very bright but short in duration in comparison to the pixel period $T_{PXL}$. The reference marker 288 in this implementation is associated with a reference pulse $P_{288}$ and the reference marker 289 is associated with a reference pulse $P_{289}$. By integrating the video signals for a period equal to the reference pulse $P_{289}$ width $T_R$, in a manner synchronous to the reference pulse $P_{289}$ width $T_R$, the reference marker 289 to object signal ratio can be made very high. In addition, subtracting from the detected value of the signal during a pulse the detected value from a neighboring $P_{289}$ "no-pulse" period $T_{NR}$ further improves the reference marker to object signal ratio.

A similar analysis is performed to detect the reference marker 288 signal. As illustrated in FIG. 7, the reference marker 288 is associated with a reference pulse $P_{288}$ having pulse width $T_B$. In the manner described above with respect to reference marker 289, the measured image signal for pulse period $T_B$ can be compared to the image signal for a "non-pulse" period $T_{NB}$ to quickly and accurately detect the reference marker 288. The reference pulses $P_{288}$ and $P_{289}$ may be pulsed at separate times, so that the $P_{289}$ "no-pulse" period $T_{NR}$ corresponds to the reference pulse $P_{288}$ width $T_B$ period, and the $P_{288}$ "no-pulse" period $T_{NB}$ corresponds to the reference pulse $P_{289}$ width $T_R$ period.

The configurations for establishing references for multi-image stitching described in this application can be implemented for fixed or mobile imaging systems, or imaging systems subjected to other variations. For example, the configurations for establishing references for multi-image stitching described in this application can be applied to cameras used on vehicles to present the operator with multiple fields of view.

Although detailed embodiments and implementations of the present invention have been described above, it should be apparent that various modifications are possible without departing from the spirit and scope of the present invention.

I claim:

1. An imaging system for generating multiple images, said imaging system comprising:
   a first imaging device including a sensor, said first imaging device having a first optical path from an object to said sensor for generating a first object image; and
   a second imaging device including a sensor, said second imaging device having a first optical path from an object to said sensor for generating a second object image, wherein
   at least one of said first imaging device and said second imaging device includes a second optical path from an external reference marker to its sensor for generating a reference image,
   wherein the reference image indicates positioning of said first imaging device or said second imaging device, and
   wherein said imaging system infers an imaging position of said second imaging device from the position of a reference image generated by the sensor of said first imaging device.

2. The imaging system according to claim 1, wherein said first imaging device has a second optical path from an external reference marker to its sensor to generate a first reference image and said second imaging device has a second optical path from an external reference marker to its sensor to generate a second reference image.

3. The imaging system according to claim 2, wherein the reference marker imaged by the sensor of said first imaging device and the reference marker imaged by the sensor of said second imaging device are the same reference marker, which is rigidly mounted at a reference position.

4. The imaging system according to claim 2, wherein
   the reference marker imaged by the sensor of said first imaging device is a first reference marker rigidly mounted on said second imaging device, and
   the reference marker imaged by said the sensor of said second imaging device is a second reference marker rigidly mounted on said first imaging device.

5. The imaging system according to claim 1, further comprising:
   a processing unit for stitching together said first object image and said second object image based on positioning of said first imaging device or said second imaging device indicated by the reference image.

6. The imaging system according to claim 2, wherein
   said first imaging device includes a reflective unit for directing radiation from the reference marker imaged by said first imaging device to its sensor, and
   said second imaging device includes a reflective unit for directing radiation from the reference marker imaged by said second imaging device to its sensor.

7. The imaging system according to claim 1, wherein the reference marker includes a first reference element and a second reference element, the first reference element emitting radiation distinct from radiation emitted by the second reference element.

8. The imaging system according to claim 1, wherein said first and second imaging devices are mounted on a vehicle.

9. The imaging system according to claim 1, wherein said first and second imaging devices are video cameras.

10. The imaging system according to claim 1, wherein
the reference marker periodically emits a pulse having a period shorter than a pixel period of said first imaging device or said second imaging device, and
said imaging system detects the reference image by integrating an image signal for a period equal to, and synchronized with, the pulse width of the reference marker.

11. The imaging system according to claim 10, wherein said imaging system subtracts from the integrated image signal a no-pulse signal from a neighboring no-pulse period to detect the reference image.

12. The imaging system according to claim 1, wherein said first object image and said second object image are located in an optical frequency band different from the optical frequency band for said reference image.

13. The imaging system according to claim 10, further comprising:
a detecting system for detecting said reference image, said detecting system including
a sample-and-hold circuit for storing the integrated image signal for the pulse period of the reference marker, and
a subtracting circuit for subtracting from the integrated image signal the no-pulse signal from a neighboring period.

14. The imaging system according to claim 2, wherein
the reference marker imaged by the first imaging device periodically emits a pulse having a period shorter than a pixel period of said first imaging device,
the reference marker imaged by the second imaging device periodically emits a pulse having a period shorter than a pixel period of said second imaging device, and
the pulse period for the reference marker imaged by the second imaging device is offset from the pulse period for the reference marker imaged by the first imaging device.

15. The imaging system according to claim 1, wherein the reference image includes a pair of separated reference elements, which in combination indicate pitch, yaw, and roll misalignment.

16. The imaging system according to claim 1, wherein the reference marker is an LED.

17. The imaging system according to claim 1, wherein
the sensor of said first imaging device is a two-dimensional sensor array, and
pixel and line coordinates for the sensor of said first imaging device are adjusted as a function of a reference image position on the sensor of said first imaging device to automatically align the first object image.

18. An imaging system for generating multiple images, said imaging system comprising:
a first imaging device including a sensor, said first imaging device having a first optical path from an object to said sensor for generating a first object image; and
a second imaging device including a sensor, said second imaging device having a first optical path from an object to said sensor for generating a second object image,
wherein:
at least one of said first imaging device and said second imaging device includes a second optical path from an external reference marker to its sensor for generating a reference image,
the reference image indicates positioning of said first imaging device or said second imaging device,
the reference marker periodically emits a pulse having a period shorter than a pixel period of said first imaging device or said second imaging device,
said imaging system detects the reference image by integrating an image signal for a period equal to, and synchronized with, the pulse width of the reference marker, and
said imaging system subtracts from the integrated image signal a no-pulse signal from a neighboring no-pulse period to detect the reference image.

19. An imaging system for generating multiple images, said imaging system comprising:
a first imaging device including a sensor, said first imaging device having a first optical path from an object to said sensor for generating a first object image; and
a second imaging device including a sensor, said second imaging device having a first optical path from an object to said sensor for generating a second object image,
wherein:
at least one of said first imaging device and said second imaging device includes a second optical path from an external reference marker to its sensor for generating a reference image,
the reference image indicates positioning of said first imaging device or said second imaging device,
the reference marker periodically emits a pulse having a period shorter than a pixel period of said first imaging device or said second imaging device,
said imaging system detects the reference image by integrating an image signal for a period equal to, and synchronized with, the pulse width of the reference marker, and
said imaging system further comprises a detecting system for detecting said reference image, said detecting system comprising:
a sample-and-hold circuit for storing the integrated image signal for the pulse period of the reference marker, and
a subtracting circuit for subtracting from the integrated image signal the no-pulse signal from a neighboring period.

* * * * *

UNITED STATES PATENT AND TRADEMARK OFFICE
CERTIFICATE OF CORRECTION

PATENT NO. : 8,125,520 B2
APPLICATION NO. : 11/602335
DATED : February 28, 2012
INVENTOR(S) : Cernasov It is certified that error appears in the above-identified patent and that said Letters Patent is hereby corrected as shown below:

In the Claims:

Column 8, line 53, Claim 4, delete the first occurrence of "said".

Signed and Sealed this
Tenth Day of July, 2012

David J. Kappos
*Director of the United States Patent and Trademark Office*